(12) United States Patent
Itey

(10) Patent No.: US 6,672,453 B1
(45) Date of Patent: Jan. 6, 2004

(54) COMPACT DISC CASE

(76) Inventor: Frederic Itey, 10, Avenue des Hameaux, Ris-Orangis (FR)

( * ) Notice: Subject to any disclaimer, the term of this patent is extended or adjusted under 35 U.S.C. 154(b) by 8 days.

(21) Appl. No.: 10/088,124

(22) PCT Filed: Sep. 18, 2000

(86) PCT No.: PCT/FR00/02586
§ 371 (c)(1),
(2), (4) Date: Jun. 11, 2002

(87) PCT Pub. No.: WO01/22420
PCT Pub. Date: Mar. 29, 2001

(30) Foreign Application Priority Data

Sep. 17, 1999 (FR) .............................. 99 11644
Jun. 27, 2000 (FR) .............................. 00 08220

(51) Int. Cl.⁷ .............................................. B65D 85/57
(52) U.S. Cl. ................... 206/308.1; 206/459.1
(58) Field of Search ................... 206/307, 308.1–308.3, 206/309, 310, 459.1; 312/9.47, 9.57

(56) References Cited

U.S. PATENT DOCUMENTS

| 4,592,600 A | | 6/1986 | Bohnet et al. |
| 5,628,399 A | | 5/1997 | Engen |
| 5,704,474 A | | 1/1998 | Oland |
| 5,890,590 A | * | 4/1999 | Doodson .................. 206/308.1 |
| 5,893,455 A | * | 4/1999 | Biedebach et al. ...... 206/308.1 |

FOREIGN PATENT DOCUMENTS

EP      0 811 976 A    12/1997

* cited by examiner

*Primary Examiner*—Jim Foster
(74) *Attorney, Agent, or Firm*—Drinker Biddle & Reath LLP

(57) ABSTRACT

The invention concerns a CD case comprising a base (1), a lid (2) and a false bottom (3) comprising a housing (31) for the disc (5) with a broad edge (33) raised on the side of the lid articulation. A window (35) is provided in the edge (33) for an indicator (4) to be urged into the housing (31) of the disc (5) to actuate it so to indicate the presence of the disc in the box.

9 Claims, 6 Drawing Sheets

COMPACT DISC CASE

FIELD OF THE INVENTION

The present invention concerns a CD disc case.

BACKGROUND OF THE INVENTION

The difficulty when using CD discs is that of management of the discs. It frequently happens, especially in the case of CD ROM discs used in information technology, that several discs are used in succession and alternately, so that disorder can develop very quickly in a series of discs.

The CD case including a indicator is already known (U.S Pat. No. 5,628,399). But its production, very complex because of the installation of the indicator with the spring interposed, renders the cost prohibitive.

The aim of the present invention is to develop a simple means for detecting from the outside the presence or absence of a CD disc in a case even when the cases are stacked or arranged vertically.

SUMMARY OF THE INVENTION

To this end, the invention concerns a CD disc case of the type defined above, characterised by the slider carrying a tongue in the shape of a very open dihedron in which the first wing is connected by a first hinge to the first portion of the slider, at a natural, non-zero angle $\alpha$. The second wing projects naturally beyond the cavity of the case to be on the path of closure of the slider and, in the absence of a disc, to co-operate with the inner face of the lid to be pushed towards the inside of the cavity and to pull the slider into the retracted position, or to be subjected to the action of the disc placed in the housing, to press against the inclined portion of the raised edge and push the slider back into its indicating position.

This form of mechanical indicator is very simple to produce, since it is sufficient to have a window in the broad edge of the false bottom and an opening in the edge of the disc housing of the false bottom to permit the passage of the slider forming the indicator.

This case, with its slider having a tongue, makes it possible to omit any return means for the slider and the latter will be certain to be situated in the retracted position in the absence of a disc inside the case. The slider with its tongue is preferably produced in one piece from plastics material and the hinge is itself produced by a film of plastics material. Depending on the elasticity or the rigidity desired for the articulation of the hinge, the film forming the latter is made thicker or thinner. The connection between the first and the second wing is relatively rigid in order to maintain correctly the very open dihedral shape for the tongue; the latter thus constitutes a relatively rigid part making it possible to push the slider into its retracted position with the inner surface and, if required, the inner edge of the lid at the moment of closure of the latter. The angle of the dihedron corresponds substantially to the inclination of the inclined portion of the raised edge.

The other articulation or hinge connecting the tongue to the first portion of the slider is relatively flexible. This articulation corresponds to an angle naturally more or less open, that is to say that its shape arises from its manufacture and that it naturally tends to reassume that angle.

Interestingly, the opening of the edge of the disc housing is extended by a cutaway portion or a recess in the base of the false bottom to constitute a means for guiding the slider.

The slider is introduced easily and quickly into the gap between the bottom and the false bottom, either through the window or through the opening, thus making it possible to produce and assemble the case in a customary manner and then place the slider in position. This also allows the user to choose sliders of different colours to permit rapid coding of the cases, it being of even greater interest that the slider appears on the edge of the case placed in order.

The visible surface of the second portion of the slider is a surface preferably coated with a material or colour contrasting with the colour of the case. It may in particular be a fluorescent colour. This colour will appear even on the edge of the case, since the broad edge overlaps the edge of the bottom of the case. At this level, whether it be a transparent portion or an absence of material, the window will make it possible to see, either directly or by refraction, the second portion of the indicator or of the slider appearing in the window and revealing the presence of a disc in the case.

According to another advantageous feature, the indicator in the form of a slider is obtained by extrusion of a profile section which is then cut into slices providing sliders. This facilitates considerably the manufacture of the indicators by avoiding having to produce extremely complicated moulds for small parts of small dimensions.

This method of manufacture also makes it possible to store the sliders more easily or to prepare them in advance, then provide them with an imprint or a personalised element such as a colour applied by coating.

The profile extrusion also makes it possible to choose materials differing from one profile section to another, depending on the applications of the slider or for tinting the profile section in the mass.

According to another advantageous feature, the profile section is extruded with materials having different mechanical properties at least in the region of the articulation; the articulation is extruded in a resilient material while the other portions are extruded in one or more rigid materials, the hues of which can be modified locally.

The indicating surface produced on the indicator may receive inscriptions and impressions. It is also possible to code the surface or to produce impressions in relief thereon or recessed therein to personalise the product. This printing means, which is difficult to falsify since it is not an impression made by laser, will complicate counterfeiting in small batches. In other words, a CD case equipped at origin with an indicator may thus be immediately authenticated by simply checking the indicator.

The indicating surface is preferably inclined in order to pass beneath the flange of the case and to be held correctly within the case.

The indicating surface constitutes a means for simple identification and classification of the cases, since by means of colour coding of the indicators, the cases may be classified without having to examine the label, which would necessitate examining the cases one by one.

On the contrary, owing to the window and the indicating surface appearing in the window, it is sufficient to offset the cases slightly with respect to one another to render the window visible and check the classification or locate errors of classification.

Such classification may also be of interest in sales containers, since the discs are generally presented in a position which is not vertical but slightly inclined, and therefore the window and the indicator are visible from one disc to another.

BRIEF DESCRIPTION OF THE DRAWINGS

The present invention will be described in more detail hereinafter with reference to the appended drawings, in which.

DETAILED DESCRIPTION OF THE INVENTION

Figure 1:
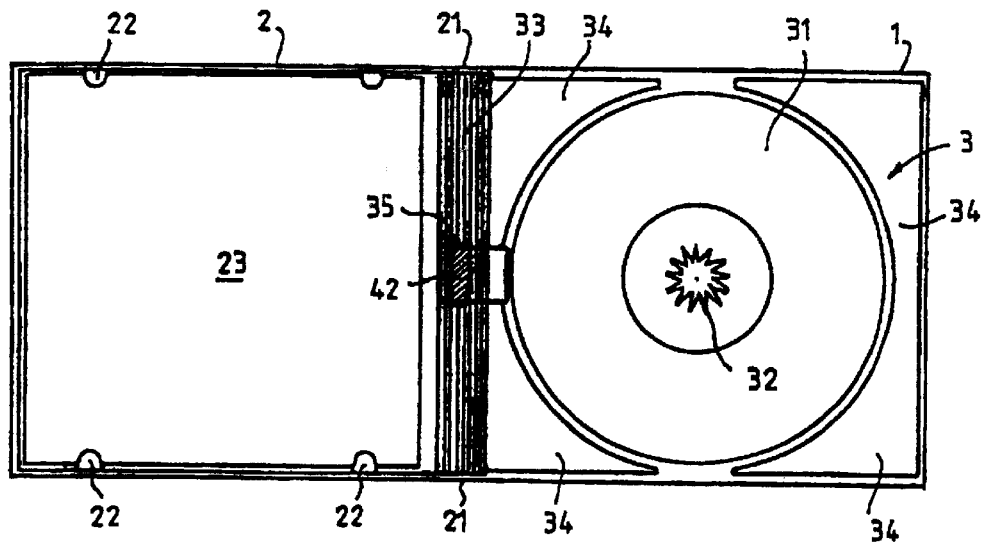
FIG. 1 is a view analogous to that of FIG. 2 of the case open but with a disc.
Figure 2:
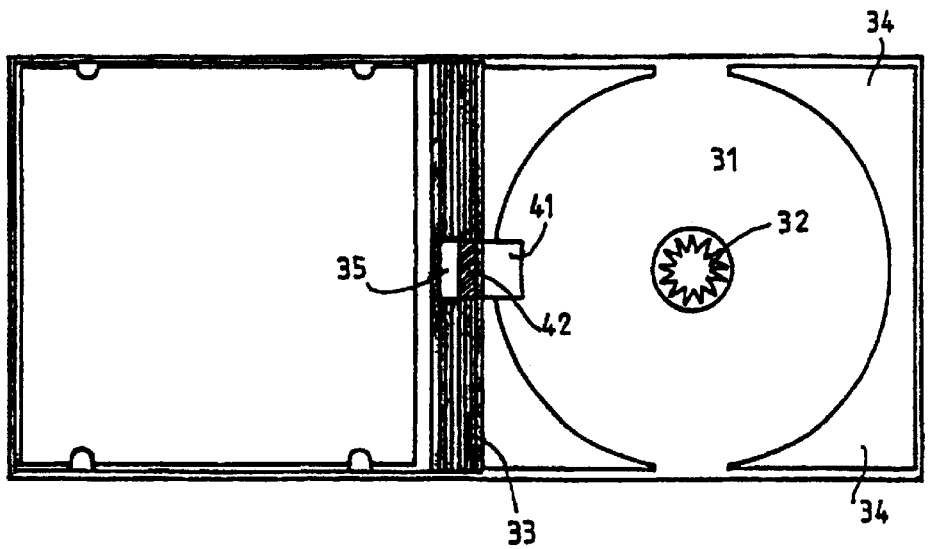
FIG. 2 is a view of an open CD disc case, without disc.
Figure 3:
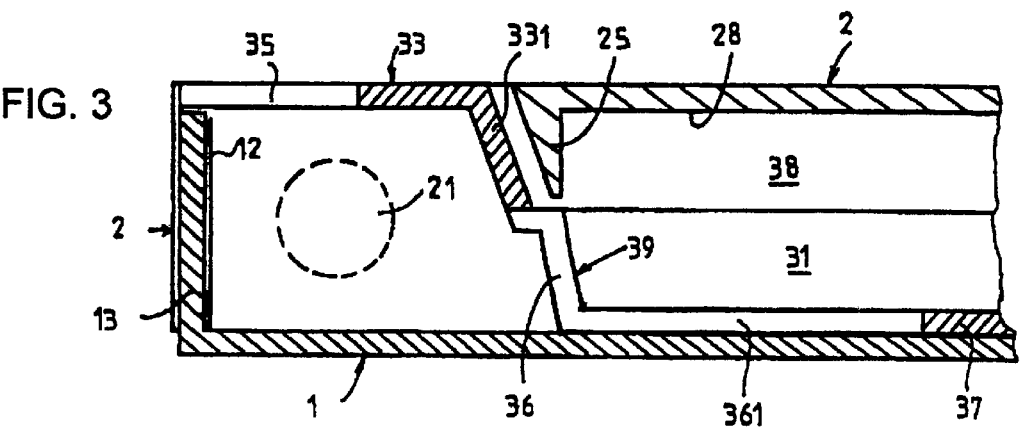
FIG. 3 is a view in partial section analogous to the preceding views, showing a case before installation of the indicator.

According to FIGS. 1, 2 and 3, the invention concerns a CD disc case intended generally for audio or video discs, or CD ROMs for information technology.

The case consists, in a known manner, of a bottom 1 to which is hooked a lid 2, and of a false bottom 3 receiving the disc.

The lid 2 is connected to the bottom 1 by an articulation consisting of pivots located on the prolongation of the lugs 21 fitting into a respective housing provided in the corresponding side walls of the bottom 1.

The bottom 1 and the lid 2 are made of transparent plastics material. The lid 2 has lugs 22 to hold a leaflet 23 or a label. The bottom 1 receives a back label 12 which also rises along the edge 13 to appear on the edge of the case (see FIG. 3).

The bottom 1 constitutes a part of the outer envelope of the disc housed in the false bottom 3.

The false bottom 3 is made of moulded plastics material, consisting of a housing 31 having the shape of a CD disc and the depth of which corresponds to the thickness of a disc. At the centre of the housing, there is a securing ring 32 with tongues onto which the CD disc is hooked to hold it in the housing. The housing 31 is surrounded by a raised area forming four curvilinear triangular sectors 34. The false bottom 3 is provided with a broad edge 33, raised from the side of the articulation of the lid 2 and covering over the edge 13 of the bottom 1.

The false bottom 3 is fitted into the bottom 1 by a mechanical linkage and when the case is closed, the broad edge 33 appears in the gap between the lugs 21 of the lid 2 which covers substantially only the square surface of the false bottom, occupied by the housing 31 and the corners 34.

The bottom 1 and the lid 2 are customarily made of a transparent plastics material to allow the labels to be seen, while the false bottom 3 is made of a dark, opaque plastics material. The broad edge 33 appears as a dark strip on the upper face of the case when the lid 2 is closed.

According to the invention, the case has a window 35 provided in the broad edge 33 of the false bottom 3. The window 35 here occupies only half the width of the edge 33; in a variant, the window occupies the entire width. The side of the housing 31 includes a passage 36 which, according to an advantageous embodiment, is located in the radial prolongation of the window 35 relative to the centre of the housing 3 (or centre of location of the disc), symmetrically with respect to the median plane PP.

The window 35 can be partially pre-cut out during moulding in order then to be removed to install an indicator in the shape of a slider. The window may also remain on cases which do not receive an indicator 4.

A presence indicator 4 projects into the housing 31 of the disc to be actuated by the latter when it is placed in position, so that the indicator appears in the window 35 of the broad edge 33.

FIG. 2 shows the slider 4 in the display position, pushed by the disc 5 bearing against the portion 41. The portion 42 represented by hatching then appears in the window 35 of the broad edge 33. FIG. 1 shows the same case open without a disc. In that instance, the indicator is returned to its retracted position. Its portion 41 projects clearly inside the interior of the housing 31 while its display portion 42 is retracted behind the broad edge 33 and is not visible.

In FIGS. 1 and 2, the cases are shown open to reveal both the indicator and the disc or the absence of a disc. In fact, the view that is obtained of the indicator, relative to the broad edge 33 of the false bottom, is the same whether the lid 2 is closed or open, since the broad edge 33 always appears between the lugs of the lid 2.

According to FIG. 3, a CD disc case of the invention consists of the bottom 1 receiving the false bottom 3 and the lid 2 which pivots relative to the bottom 1 about pivots 21. The bottom 1 and its side 13 are occupied by a label 12. The housing 31 is surmounted by a cavity 38 covered over by the lid 2. The false bottom 3 consists of a base 37 and of an edge forming the housing 31 and, above the housing 31, of a raised edge 33 with a window 35. The inclined portion 331 of the raised edge 33 is opposite the inner edge 25 of the lid 2 when the latter is closed. A clearance remains between the inclined portion 331 and the inner edge 25 of the lid 2.

The false bottom 3 includes a cutaway portion 36 in the side edge 39 on the same side as the raised edge 33, which is continued by a cutaway portion 361 in the base 37. As a variant, there may be only a recess (not shown) serving, like the cutaway portion, to guide the slider. The cutaway portions 36, 361 (or recesses) and the window 35 are preferably aligned radially with respect to the centre of the housing 31.

The case in FIG. 3 is completed by a slider 4 (FIG. 4A) consisting of a first portion 31 and a second portion 42. The portion 41 projects into the housing 31 and the display portion 42 comes to the level of the window 35 or beneath the raised edge 33 to cause the indicating surface 421 to appear or to retract it, depending on the indication to be displayed (disc in place or disc absent).

Figure 4A:
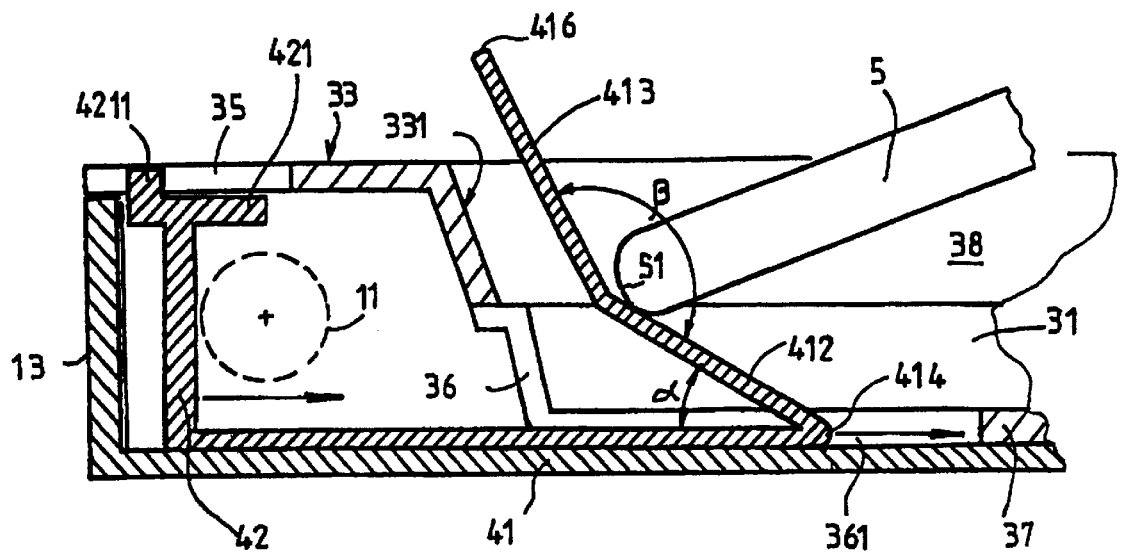
FIG. 4A is a view analogous to that of FIG. 3 of a case with an indicator, at the moment when a disc is placed in position, the indicator occupying a certain initial position, FIG. 4B corresponds to FIG. 4A, but for the indicator in a different initial position.

According to a very interesting variant illustrated only in FIG. 4A, the indicating surface is extended upwards by a portion 4211 which penetrates into the opening of the window 35 to appear especially on the edge of the case, when the slider adopts the position in FIG. 4A. The portion 4211 is sufficiently thin at the level of the window 35 not to be perceptible in the window when the slider is in the retracted position, in order not to risk giving a false indication of the presence of a disc in the case.

The slider 4 carries a relatively rigid tongue in the shape of a very open dihedron. The angle of the dihedron is substantially larger than the angle of the inclined portion 331 and the base 37. The tongue consists of a first wing 412 and a second wing 413. The first wing 412 is connected by an edge 414 to the end of the first portion 41 of the slider 4 and the second wing 413 is connected to the first wing 412 by an articulation 415. The second wing 413 ends in an edge 416.

In the natural position, in the absence of external constraints, the slider and its tongue are in the arrangement shown in FIG. 4A. The first wing 412 forms a non-zero angle a with the first portion 41, corresponding to the natural state of its articulation 414, and under the same conditions the second wing 413 forms an angle B with the first wing 412. The edge 415 is rigid so that the angle B is substantially not deformed by the effect of external forces.

Figure 6A:
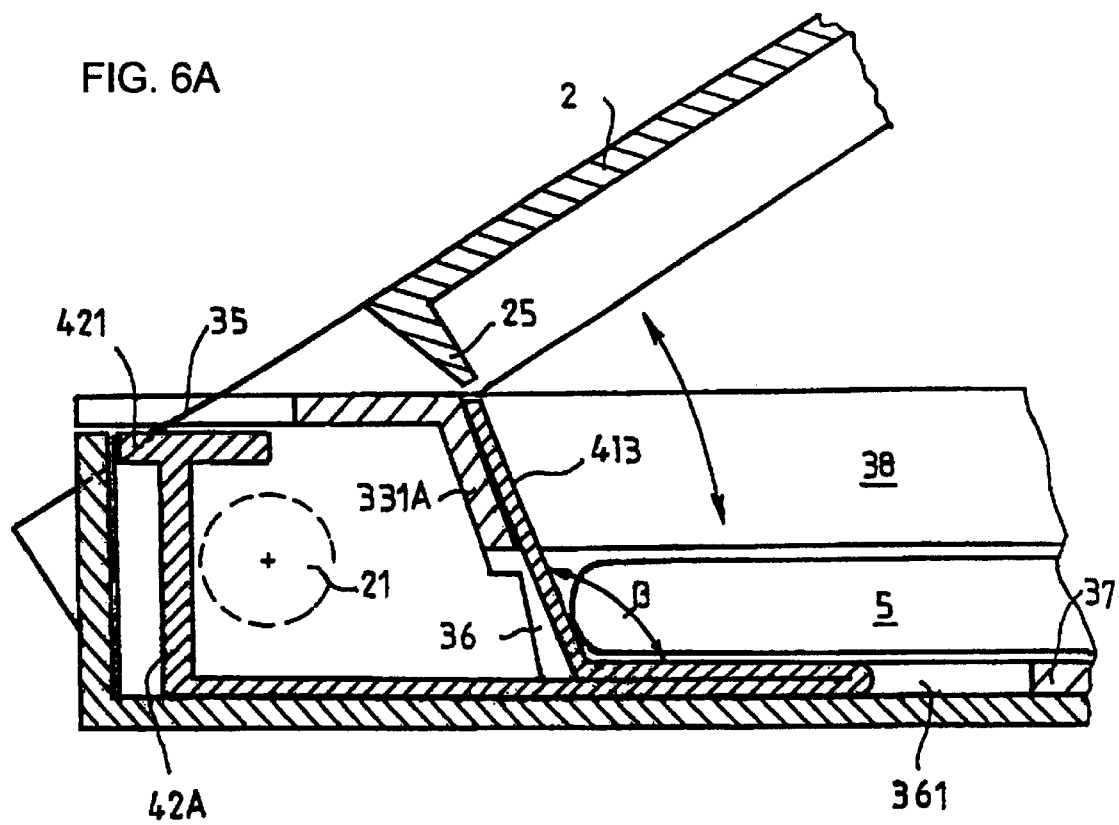
FIG. 6A is a view of a case, the disc being placed in position and the lid in the course of being closed, FIG. 6B corresponds to the case in FIG. 6A when the lid is closed.

FIG. 4A shows an inclined disc 5 which is leant by its edge 51 against the wing or wings 412, 413 in order to place it in its housing 31. By this natural movement of introduction of the disc 5, at first in the inclined position, then being flattened against the base 37 and the central boss, the disc crushes and pushes back the wings 412, 413 to bring them into the position shown in FIG. 6A. This movement of introduction of the disc 5 according to FIG. 4A has the effect of simply folding back the wing 412 flat against the first portion 41 of the slider 4 and of the wing 413 coming against the inclined portion 331 of the raised edge 33. During the course of this movement, since the second portion 42 of the slider 4 is already abutting the wall 13 of the bottom 1, there is no translational movement of the slider. The initial position of the slider 4 is one which is adopted hypothetically, assuming the extreme case of the slider 4 which would already be in the display position after the opening of the lid; this position may result from simple sliding of the slider under the action of the movement of opening of the lid.

After this placing in position, the lid 2 may be closed again, its inner edge coming over the top of the second wing 413.

Figure 4B:
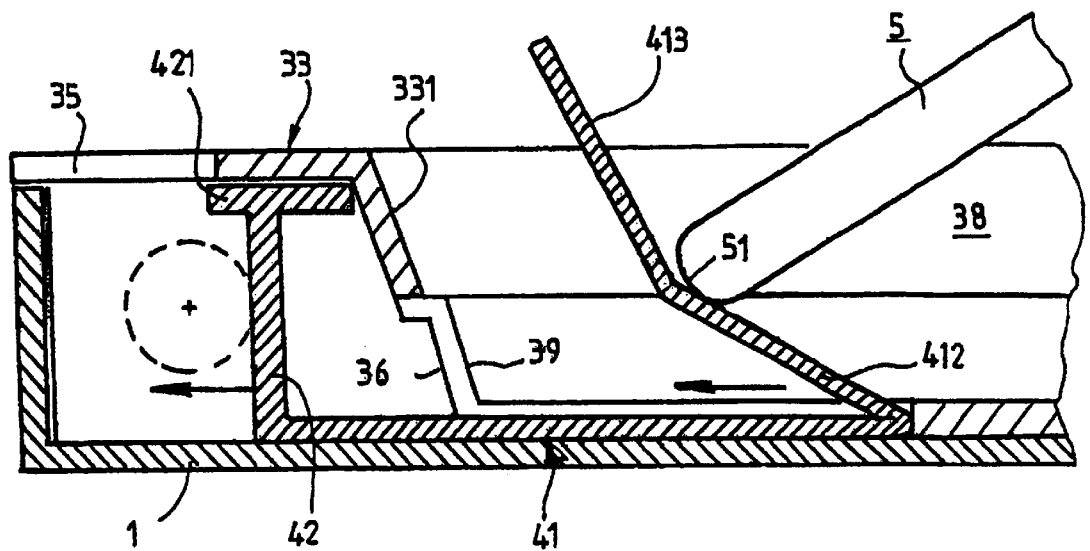
FIG. 4C is a sectional view analogous to FIG. 4A showing an alternative embodiment of the slider.
Figure 6B:
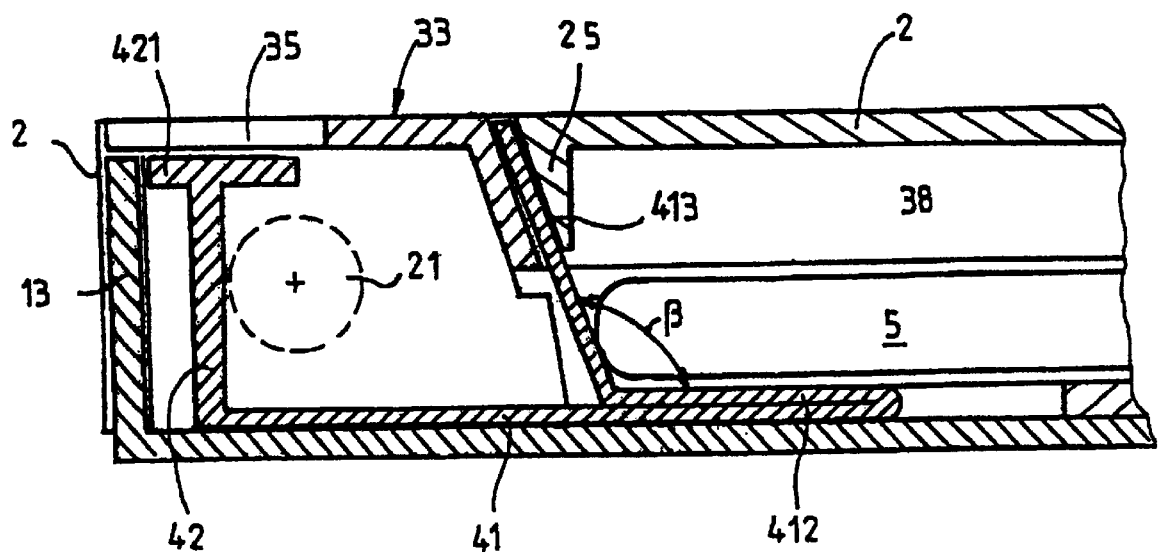

At the moment when the disc 5 is placed in position in the case, the slider may also occupy an advanced position such as that shown in FIG. 4B. This initial position of the slider 4 is more natural if the case was empty before the opening of the lid. In that instance, the movement of introduction of the disc 5 has the effect that its edge 5 bears against the wings 412 and/or 413 which undergo a combined movement elastically deforming the articulation 414 between the wing 412 and the first portion 41A so that the wing 412 lies flat; this movement is associated with the forced pivoting of the wing 413 and the translational movement of the slider; that brings the slider 4, and in particular the second portion 42 and its indicating member 421, from the position in FIG. 4B to the position in FIG. 6A. At that moment, the case may be closed to reach the closed position shown in FIG. 6B.

When there is a disc 5 in the case, the closure of the lid 2 has the effect of locking the slider in the indicating position, since the wing 413 is pinched between the inclined portion 331 and the inner edge 25 of the lid. This avoids the risk of the elasticity of the tongue lifting the first wing 412 and thus the disc 5, as a result of the effect of vibrations or shocks.

Figure 4C:
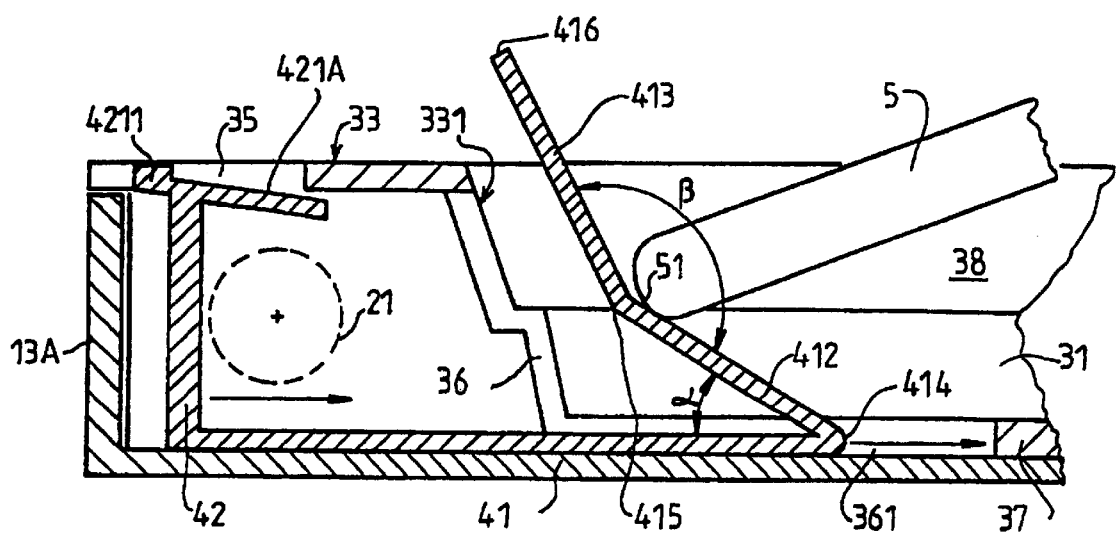

FIG. 4C shows an alternative embodiment of a case. In this variant, the indicating surface 421A is inclined in order to pass beneath the edge 33 and appear in the window 35. The indicating surface 421A is also very inclined, in order to pass over the top of the upper edge of the side 13 when the slider is completely withdrawn towards the right.

Figure 5:
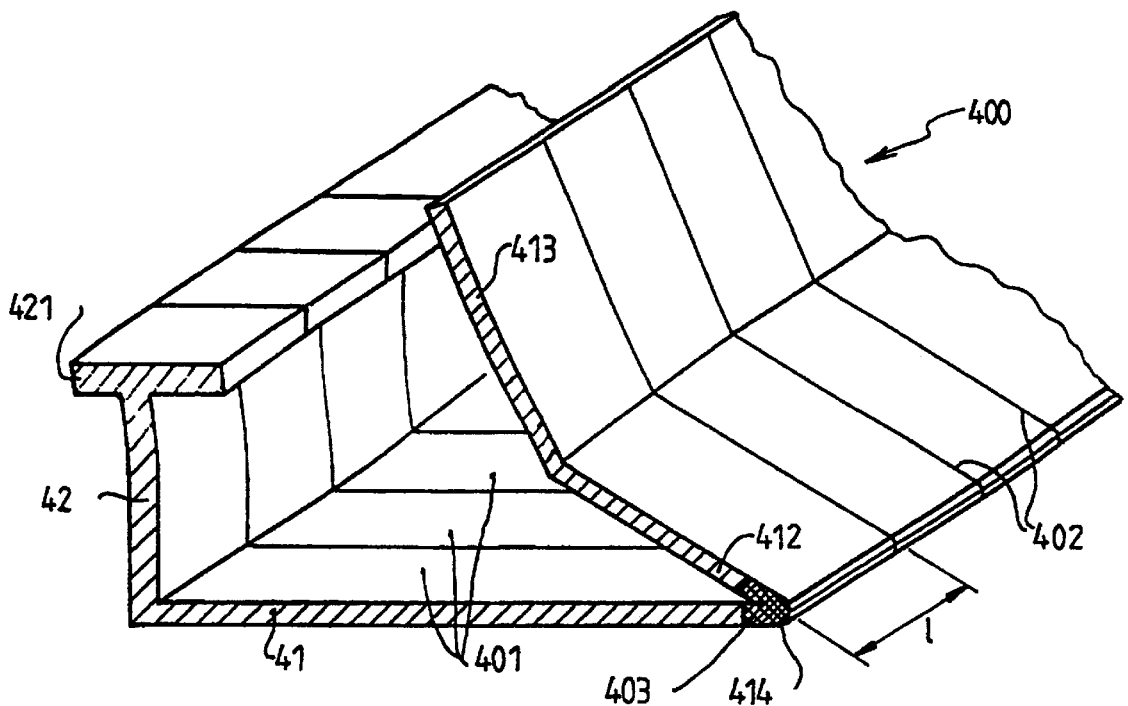
FIG. 5 is a perspective view of a profile section in which are cut the sliders according to the embodiment of FIG. 4B.

FIG. 5 shows a particularly advantageous embodiment of the sliders, according to which a profile section 400 having the cross-section of a slider in an uncompressed position is manufactured. Slices of the profile section are then cut, having a length (1), corresponding to the width of a slider 401, according to a cutting line 402.

This method of manufacture is very interesting, since it makes it possible not only to simplify the manufacture of the sliders 401, but also to produce them with portions made of materials having different properties, especially different mechanical properties. Thus the portion 403 at the articulation 414 is made of a flexible and elastic material, while the other portions such as 41, 42, 421 or 412, 413 are made of a rigid material.

Although the embodiment of the profile section in FIG. 5 corresponds to the cross-section of the slider in FIG. 4B, any other shape of slider may be produced in this manner, and in particular the slider in FIGS. 4A and 4C.

It is also possible to diversify the materials used for the manufacture of the profile section 400 and, for example, provide the indicating surface 421 with a colour different from that of the other portions.

Even if the profile section 400 is not tinted in the mass, it is possible to provide it with a colour on request and to print, for example, on the indicating surfaces 421, logos, brand-names or others, which will be particularly perceptible, on backgrounds of fluorescent or very distinct hue.

The fact that the indicating surface 421 is very visible is of great interest for the classification of cases, since it is sufficient to incline them or to offset a stack of cases by the width corresponding substantially to the window 35 in order to allow the indicating surface 421 of the different cases of the stack to appear.

Figure 7A:
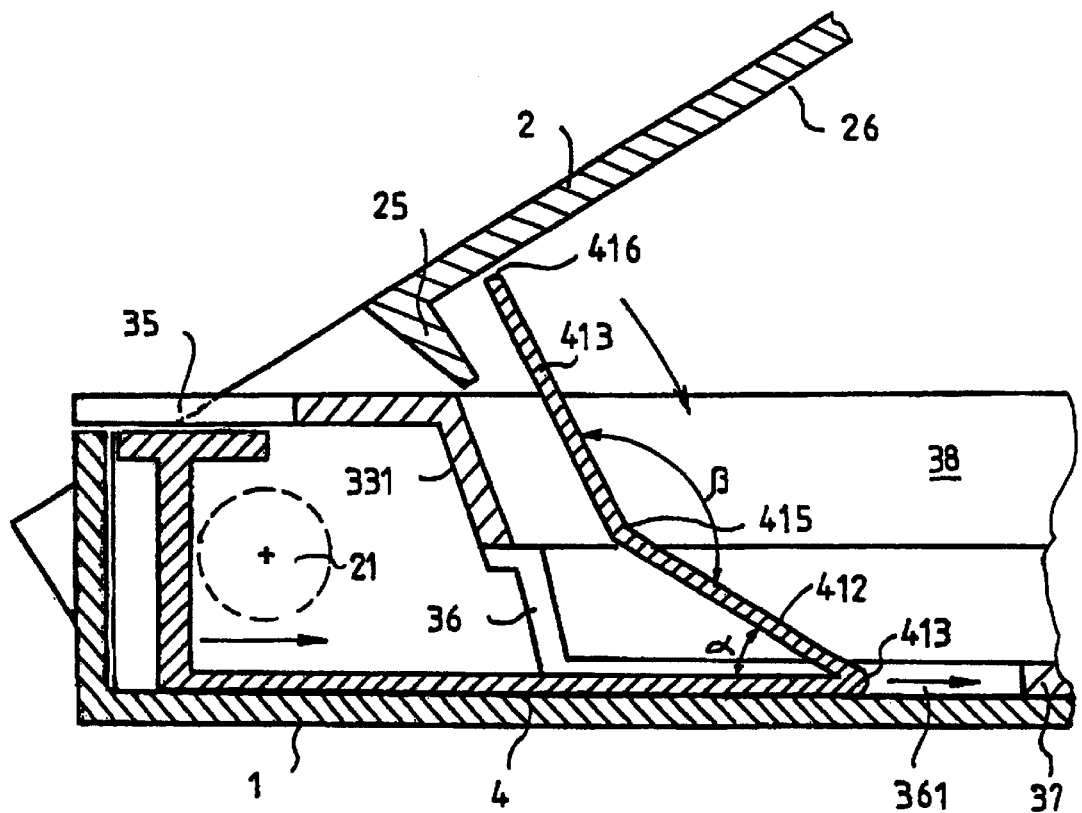
FIG. 7A is a view analogous to that of FIG. 6A at the moment of closure of a case without disc.
Figure 7B:
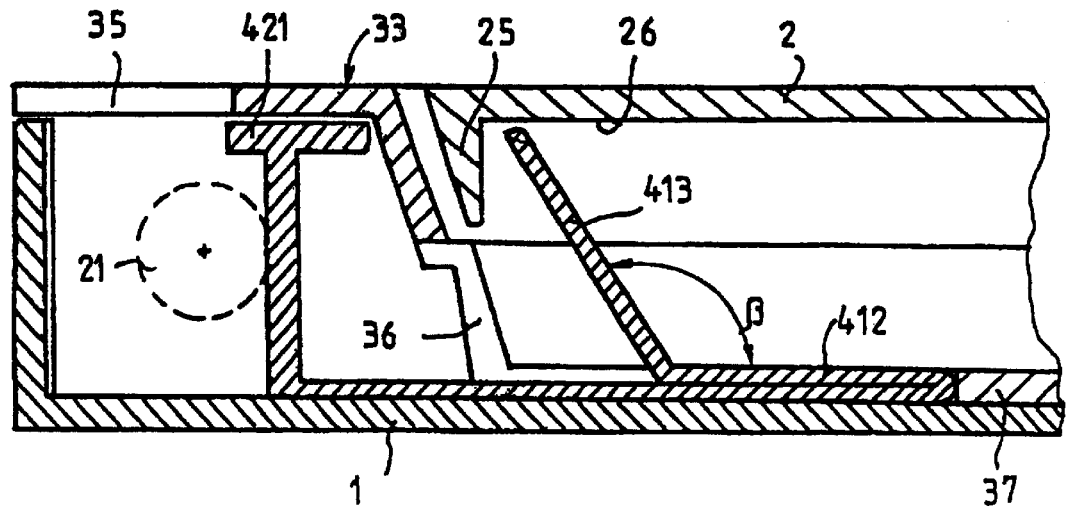
FIG. 7B is a view of the case in FIG. 7A after the closure of the lid.

FIGS. 7A and 7B show the closure of a case in the absence of a disc.

According to FIG. 7A, the tongue of the slider 4 naturally adopts the detent position illustrated: the first wing 412 is raised according to its natural angle □ and the second wing 413 forms with the first wing 412 the angle β. Under these conditions, a portion of the wing 413 projects from the edge of the cavity 38 normally covered by the lid.

The lid 2 is shown in the course of closure. The edge 416 of the second wing is placed on the path of the wing 2 and thus meets the inner surface 26 of the lid 2. The pivoting movement of the wing 2 continues. The edge 416 is then pushed by the inner surface 26 until, if required, the edge 416 meets the inner edge 25 of the lid 2. The wings 413, 412 are pushed while closing the natural angle □ and pressing the first wing 412 against the first portion 41 of the slider (FIG. 7B); this movement is accompanied by a translational movement of the slider in the direction indicated by the arrows in FIG. 7A. At the end of the movement of closure of the lid 2, the slider 4 adopts the position shown in FIG. 7B.

In this position, the slider 4 is blocked by the locking produced between the inner face 26 or if required the inner edge 25 of the lid 2 and the edge 416 of the second wing 413, thus preventing the slider from moving in the opposite direction. The second portion 42 of the slider, and especially the display surface 421 are held in the retracted position beneath the raised edge 33, beyond the window.

Figure 8A:
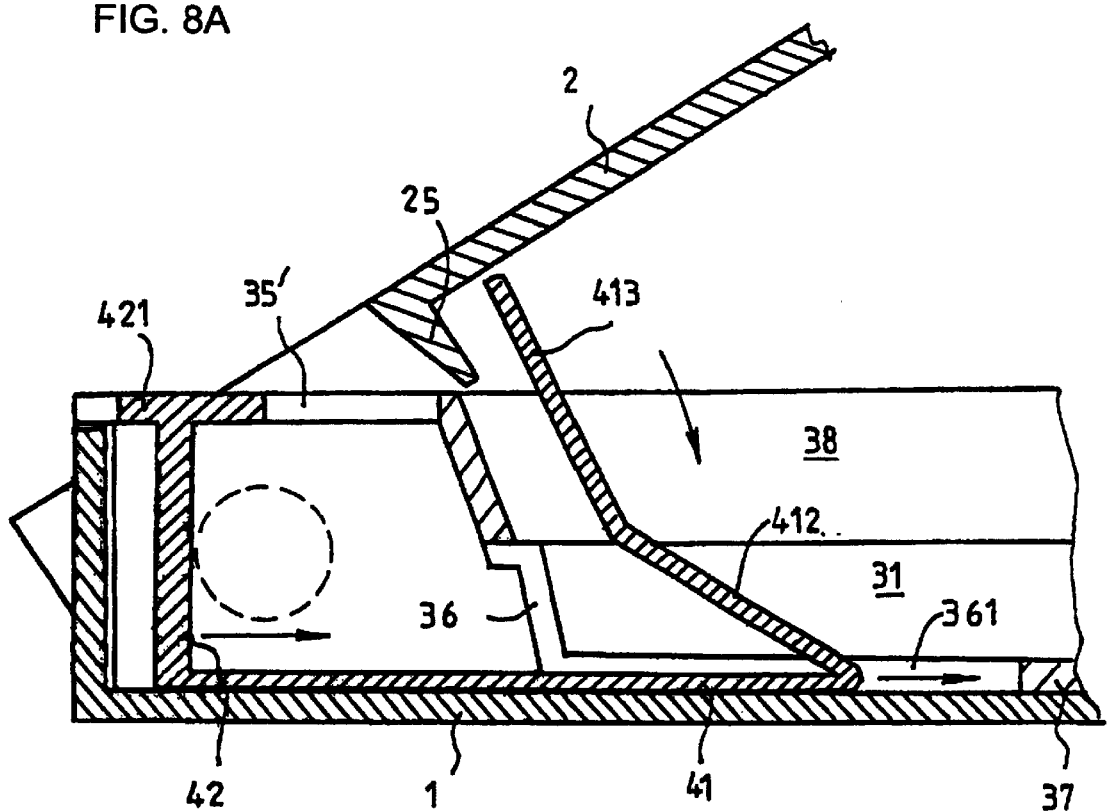
FIG. 8A shows the case without disc in the position illustrated in FIG. 7A, at the moment of closure of the lid.
Figure 8B:
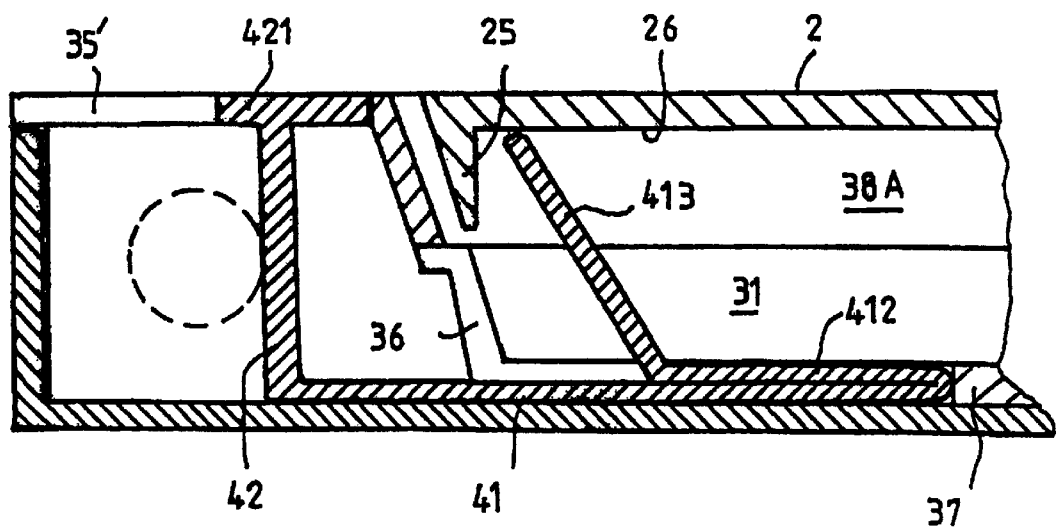
FIG. 8B shows the variant of FIG. 7A, the lid being closed.

The variant in FIGS. 8A and 8B simply concerns the size of the window 35' in the raised edge 33. The window extends over the entire width of the raised edge and the indicating surface 421 of the second portion 42 of the slider is visible in the retracted position and in the indicating position. The only difference is that in one of the positions it is located on one side of the opening of the window and in the other position at the other end of the window.

This alternative embodiment corresponds to a choice of manufacture which, in certain cases, may be simpler than that of a window occupying only a portion of the width of the raised edge of the false bottom.

What is claimed is:

1. A compact disc case comprising:
   a bottom,
   a lid connected to the bottom by an articulation formed by the prolongation of two sides of the lid, each time constituting a lug provided with a pivot and connected externally by the pivots to the articulation apertures of the bottom,
   a false bottom comprising
      a housing for the disc, surrounded by a raised area,
      a broad edge raised from the side of the articulation of the lid,
   the false bottom being fitted into the bottom and the broad edge appearing in the gap between the lugs of the lid, substantially at the level of the closed lid,
   a window in the upper surface of the broad edge,
   an indicator in the form of a slider
      coming into the housing of the disc,
      to be actuated by the disc placed in position in its housing and to appear in the window to indicate the presence of the disc in the case,
   wherein the slider carries a tongue in the shape of a very open dihedron in which
      the first wing is connected by a first hinge to the first portion of the slider,
      at a natural, non-zero angle
      the second wing projects naturally beyond the cavity of the case to be on the path of closure of the lid and, in the absence of a disc, to co-operate with the inner surface of the lid to be pushed towards the inside of the cavity and to pull the slider into the retracted position,
      alternately to be subjected to the action of the disc placed in position in the housing, press itself against the inclined portion of the raised edge and push the slider back into its indicating position.

2. A compact disc case according to claim 1, wherein the angle of the dihedron of the tongue corresponds substantially to the inclination of the inclined portion of the raised edge relative to the base of the false bottom.

3. A compact disc case according to claim 1, wherein the opening of the edge of the housing is extended by a portion in the base of the false bottom to constitute a means for guiding the slider.

4. A compact disc case according to claim 1, wherein the slider and the tongue are produced in one piece from plastic material.

5. A compact disc case according to claim 1, wherein the slider is obtained by extrusion of a profile section, cut to the length of a slider.

6. A compact disc case according to claim 5, wherein the profile section is made from materials having different properties, the material in at least the region of the articulation being made of a resilient material and at least one other portion being made of a rigid material.

7. A compact disc case according to claim 1, wherein the opening of the false bottom is partially pre-cut out to be removed upon installation of a slider.

8. A compact disc case according to claim 1, wherein the visible surface forming the indicating surface of the second portion of the slider is coated with a color contrasting with the color of the case.

9. A compact disc case according to claim 1, wherein the window in the broad edge is located substantially in the middle of the length of the broad edge and the opening in the edge of the disc housing of the false bottom is located in the alignment of the window and of the center of the disc housing.

* * * * *